(12) United States Patent
Syu (10) Patent No.: US 8,657,317 B2
(45) Date of Patent: Feb. 25, 2014

(54) QUICK-RELEASE FIXING STRUCTURE FOR A FENDER OF A BICYCLE

(75) Inventor: Guo-Jhong Syu, Changhua County (TW)

(73) Assignee: Sunny Wheel Industrial Co., Ltd., Changhua County (TW)

( * ) Notice: Subject to any disclaimer, the term of this patent is extended or adjusted under 35 U.S.C. 154(b) by 46 days.

(21) Appl. No.: 13/405,292

(22) Filed: Feb. 25, 2012

(65) Prior Publication Data

US 2013/0223924 A1   Aug. 29, 2013

(51) Int. Cl.
*B62D 25/18*   (2006.01)

(52) U.S. Cl.
USPC ......... 280/152.1; 280/848; 403/324; 403/325

(58) Field of Classification Search
USPC ........ 403/109.6, 109.8, 324–326, 378, 379.1, 403/379.2, 379.5; 280/152.1, 152.2, 154, 280/160.1, 852, 854; 285/305
See application file for complete search history.

(56) References Cited

U.S. PATENT DOCUMENTS

| | | | |
|---|---|---|---|
| 3,124,157 A * | 3/1964 | Krzewina | 137/583 |
| 3,796,502 A * | 3/1974 | Federspiel | 403/106 |
| 4,557,261 A * | 12/1985 | Rügheimer | 403/325 |
| 4,930,932 A * | 6/1990 | LeVahn | 403/325 |
| 5,104,158 A * | 4/1992 | Meyer et al. | 285/308 |
| 5,316,041 A * | 5/1994 | Ramacier et al. | 137/614.04 |
| 5,472,254 A * | 12/1995 | Wander | 403/324 |
| 5,607,087 A * | 3/1997 | Wery et al. | 285/305 |
| 6,331,011 B1 * | 12/2001 | Feldmann et al. | 280/152.1 |
| 6,435,533 B1 * | 8/2002 | Chuang | 280/152.1 |
| 7,568,855 B2 * | 8/2009 | Fitzler et al. | 403/326 |
| 7,654,550 B2 * | 2/2010 | Chuang | 280/288.4 |
| 8,087,451 B2 * | 1/2012 | Gammons | 165/46 |
| 8,128,116 B1 * | 3/2012 | Huston et al. | 403/109.6 |
| 2002/0084652 A1 * | 7/2002 | Halbrock et al. | 285/305 |
| 2008/0303244 A1 * | 12/2008 | Wang | 280/297 |
| 2009/0058083 A1 * | 3/2009 | Dorman et al. | 285/305 |
| 2010/0269822 A1 * | 10/2010 | Shiue | 128/202.27 |

FOREIGN PATENT DOCUMENTS

JP   2004003626 A *   1/2004   ........... F16L 37/08

* cited by examiner

*Primary Examiner* — Michael P Ferguson
*Assistant Examiner* — Matthieu Setliff
(74) *Attorney, Agent, or Firm* — Banger Shia (57) ABSTRACT

A quick-release fixing structure for a fender of a bicycle is provided with a mounting member fixed to the front fork, an engaging member fixed on the fender, and a U-shaped control member. The mounting member is formed with an elastic piece, a receiving cavity, and two penetrating holes which have two cutting grooves in communication with the receiving cavity and the penetrating holes. The engaging member is received in the receiving cavity of the mounting member and formed with two arc-shaped cutting grooves for mating with the arc-shaped cutting grooves of the mounting member. The control member is inserted in the penetrating holes and formed with two arc-shaped grooves. The quick-release fixing structure is capable of assembling the fender onto the front fork of bicycle or disassembling it therefrom by a simple pressing operation.

8 Claims, 11 Drawing Sheets

QUICK-RELEASE FIXING STRUCTURE FOR A FENDER OF A BICYCLE

BACKGROUND OF THE INVENTION

1. Field of the Invention

The present invention relates to a fender, and more particularly to a simply structured and easily operable quick-release fixing structure which is capable of assembling the fender onto the front fork of a bicycle or disassembling it therefrom by a simple pressing operation.

2. Description of the Prior Art

Figure 1:
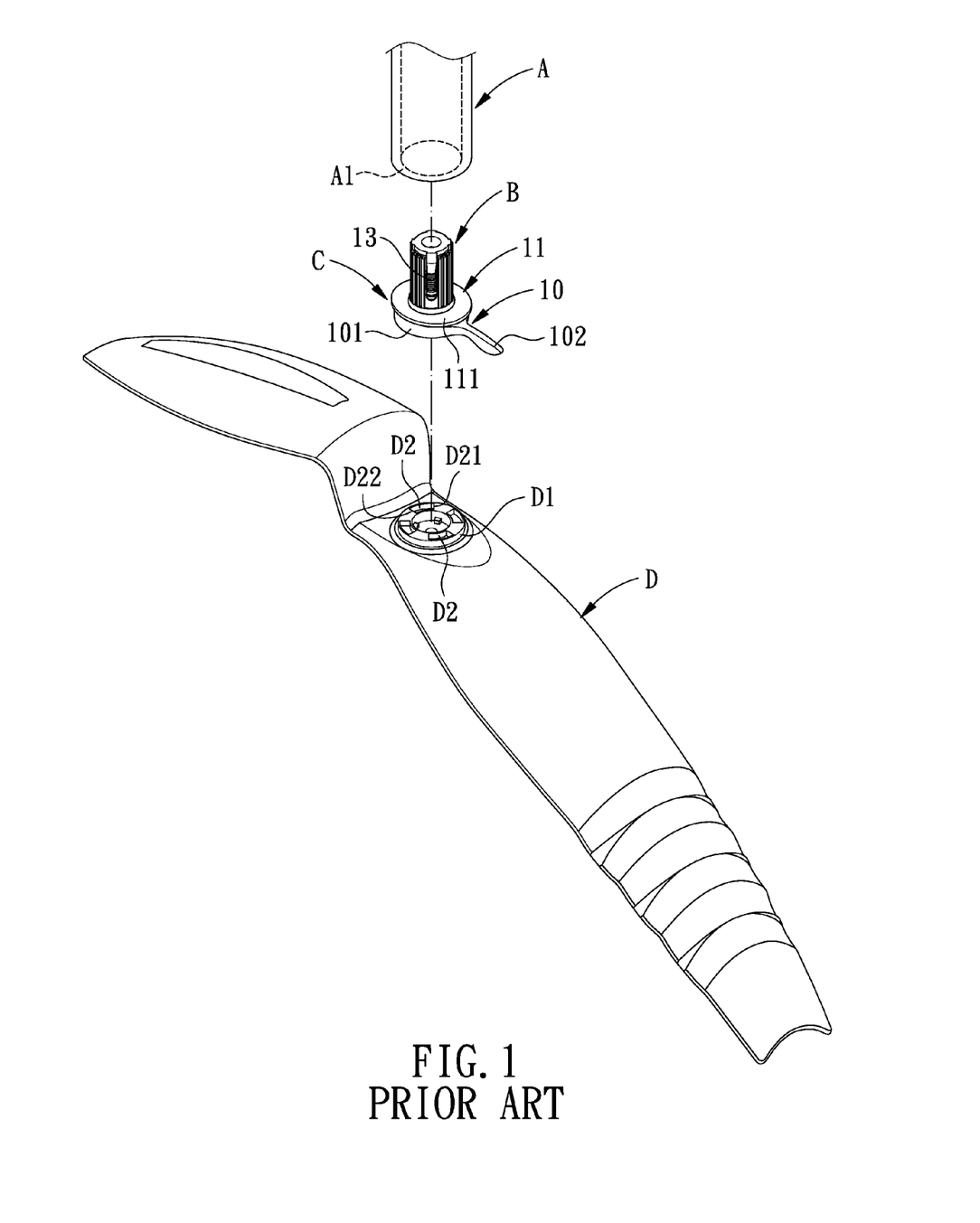
FIG. 1 is an exploded view of a conventional fender fixing structure.
Figure 2:
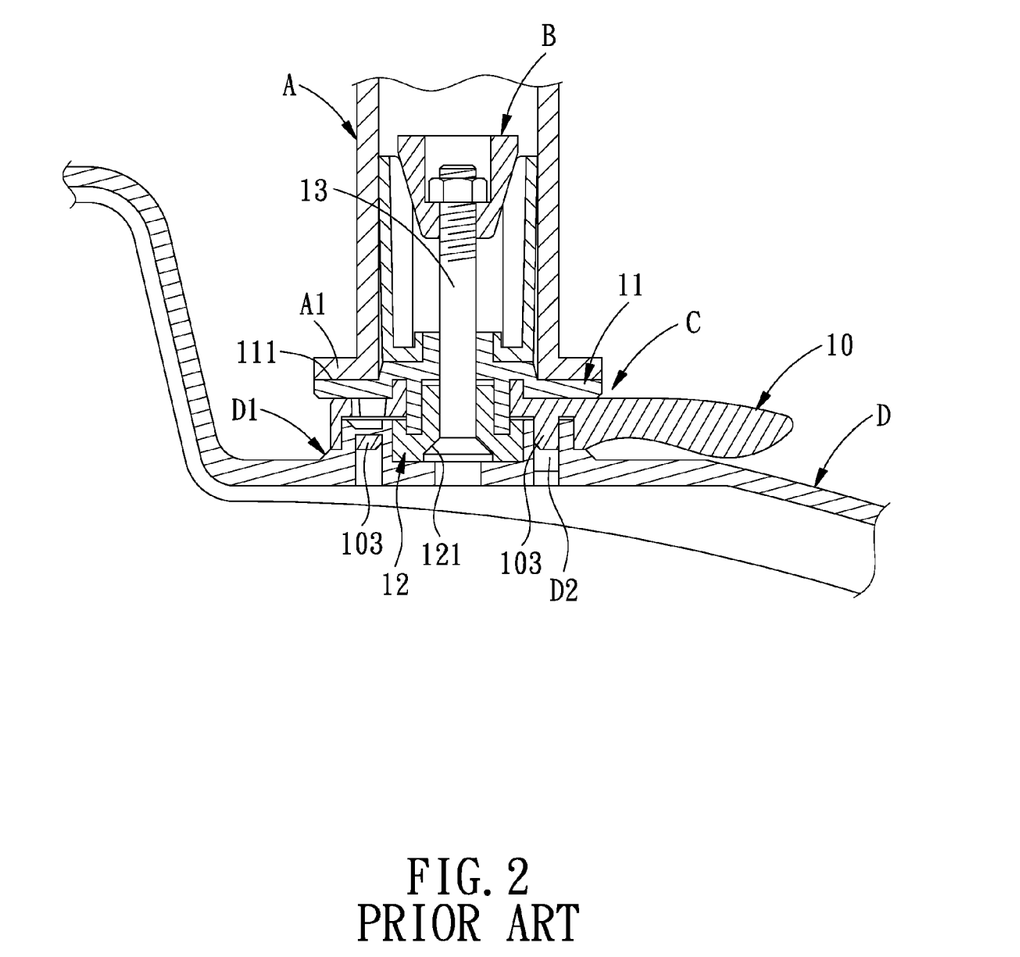
FIG. 2 is a cross sectional view of the conventional fender fixing structure.
Figure 3:
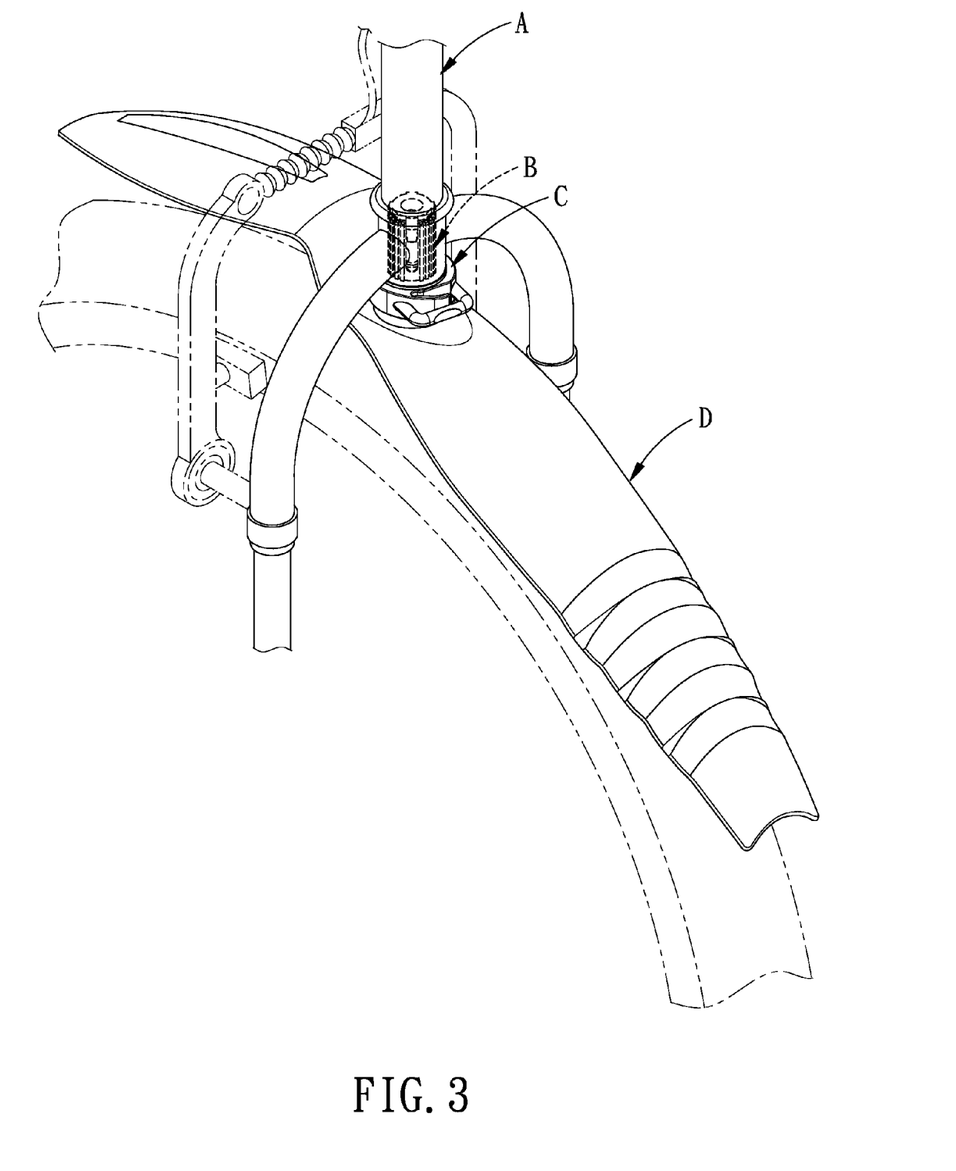
FIG. 3 shows a quick-release fixing structure for a fender of a bicycle in accordance with a first embodiment of the present invention.

As shown in FIGS. 1 and 2, a conventional removable fender D is fixed to a front fork A of a bicycle by a tightening device B and a quick-release fixing structure C. The fender D is provided on its surface with a circular connecting portion D1 which is formed around the periphery thereof with four arc-shaped cavities D2, and at both ends of each of the arc-shaped cavities D2 are formed with an inner wall D21 and an opening D22.

The quick-release fixing structure C includes a control member 10 which is formed with a mounting portion 101 and a handle portion 102, and a disc member 11 disposed at the top of the mounting portion 101. The disc member 11 is formed with an annular end surface 111 against which an abutting end A1 of the front forth A is pressed. Below the mounting portion 101 is disposed a connecting member 12, and the mounting portion 101 is provided with four L-shaped engaging blocks 103 around the connecting member 12. The connecting member 12 is formed with a central hole 121. The connecting member 12, the mounting portion 101 of the control member 10 and the disc member 11 are inserted on a bolt 13, and then the tightening device B is screwed with the bolt 13 and then fixed in the front fork A by pressing against the inner surface of the front fork A, so that the fender D is fixed to the front fork A in such a manner that the four engaging blocks 103 of the control member 10 are engaged in the four arc-shaped cavities D2 of the fender D, and the ends of the engaging blocks 103 are inserted in the openings D22 of the arc-shaped cavities D2.

Pulling the handle portion 101 of the control member 10 can install or disassemble the fender D. However, this conventional fender still has the following disadvantages:

1. The engagement of the control member 10 with the fender D is achieved by rotating the mounting portion 102, and in assembly, it is not easy for the user to see the positions of the engaging blocks 103 by looking from above the control member 10, so the user has to try to align the arc-shaped cavities D2 with the engaging blocks 103, then rotates the control member 10 to fix the fender D. however, rotating the control member 10 may cause misalignment of the fender D with respect to the wheel of the bicycle. Therefore, the user has to pull the handle portion 102 of the control member 10 again to readjust the position of the fender D even after the fender D is fixed.

2. The quick-release fixing structure C is engaged with the fender D in a rotating member (by pulling the control member to rotate), and the engaging structures of the quick-release fixing structure C and the fender D are located in the rotating direction, so the engaging structures or the handle portion 102 of the control member 10 are likely to be damaged if the user pulls the handle portion 102 too hard.

3. since the operation of the quick-release fixing structure C is controlled by the rotation of the control member 11, it has to use the disc member 11 and the connecting member 12 to prevent the control member 11 from being worn out by the front fork A and the fender D during rotation, which makes the structure complicated and increases the cost.

The present invention has arisen to mitigate and/or obviate the afore-described disadvantages.

SUMMARY OF THE INVENTION

The primary object of the present invention is to provide a simply structured and easily operable quick-release fixing structure which is capable of assembling the fender onto the front fork or disassembling it therefrom by a simple pressing operation.

To achieve the above object, a quick-release fixing structure for a fender of a bicycle in accordance with the present invention comprises: a mounting member, an engaging member, and a control member.

The mounting member is connected to an end of the front fork, in a bottom of the mounting member is formed a receiving cavity whose axial direction is defined as a longitudinal direction. The mounting member is formed around its periphery with two penetrating holes which penetrate through the periphery of the mounting member to leave two cutting grooves on an inner surface of the receiving cavity, and the cutting grooves are in communication with the receiving cavity and the penetrating holes. An axial direction of the penetrating holes is defined as a transverse direction, an elastic piece extends from the mounting member, and a bolt which extends in the longitudinal direction is inserted through the receiving cavity and screwed with the tightening device.

The engaging member is disposed on the fender and received in the receiving cavity of the mounting member and formed around its periphery with two arc-shaped cutting grooves for mating with the arc-shaped cutting grooves of the mounting member.

The U-shaped control member is provided with a pressing section and two engaging sections at both ends of the pressing section. The engaging sections of the control member are inserted in the penetrating holes, and each of the engaging sections is formed on an inner surface thereof facing the engaging member with an arc-shaped groove for mating with the cutting groove of the mounting member. The elastic piece of the mounting member is capable of pressing against the pressing section of the control member to make the arc-shaped grooves of the control member misaligned with the cutting grooves of the mounting member, so that the engaging member is engaged with the mounting member, or make the arc-shaped grooves of the control member aligned with the cutting grooves of the mounting member, so that the engaging member is disengaged from the mounting member.

The engaging structures are all engaged in the transverse direction, while the force for pushing the quick-release fixing structure is applied in the longitudinal direction, which enables the quick-release fixing structure to have a relatively strong structural strength, so as to prevent the quick-release fixing structure from being damaged when it is pushed too hard.

The engaging member can also been integral with the fender and inserted directly in the mounting member.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 3, 4, 5 and 7B, a quick-release fixing structure C for a fender of a bicycle in accordance with a preferred embodiment of the present invention is used to fix a fender D to the front fork A of the bicycle by cooperating with a tightening device B and comprises: a mounting member 20, an engaging member 30 and a control member 40.

The mounting member 20 is connected to an end of the front fork A, and abutting edge A1 of the end of the front fork A is pressed against a top surface 21 of the mounting member 20. In the bottom of the mounting member 20 is formed a receiving cavity 23 whose axial direction is defined as a longitudinal direction Y, and the receiving cavity 23 is formed around its inner surface with two opposite arc-shaped surfaces 231 and two opposite restricting surfaces 232. In the bottom of the receiving cavity 23 is formed a tapered hole 24 tapering toward the front fork A. The mounting member 20 is formed around its periphery with two opposite arc-shaped surfaces 25, and in each of the arc-shaped surfaces 25 is defined a penetrating hole 26 which penetrates through the arc-shaped surfaces 25 to leave a cutting groove 261 in each of the arc-shaped surfaces 231, and the cutting grooves 261 are aligned to and in communication with the receiving cavity 23 and the penetrating holes 26. The axial direction of the penetrating holes 26 is defined as a transverse direction X. An elastic piece 27 extends from an end of one of the arc-shaped surfaces 25 of the mounting member 20, and a bolt 29 which extends in the longitudinal direction Y is inserted through the receiving cavity 23 and screwed with the tightening device B.

Figure 4:
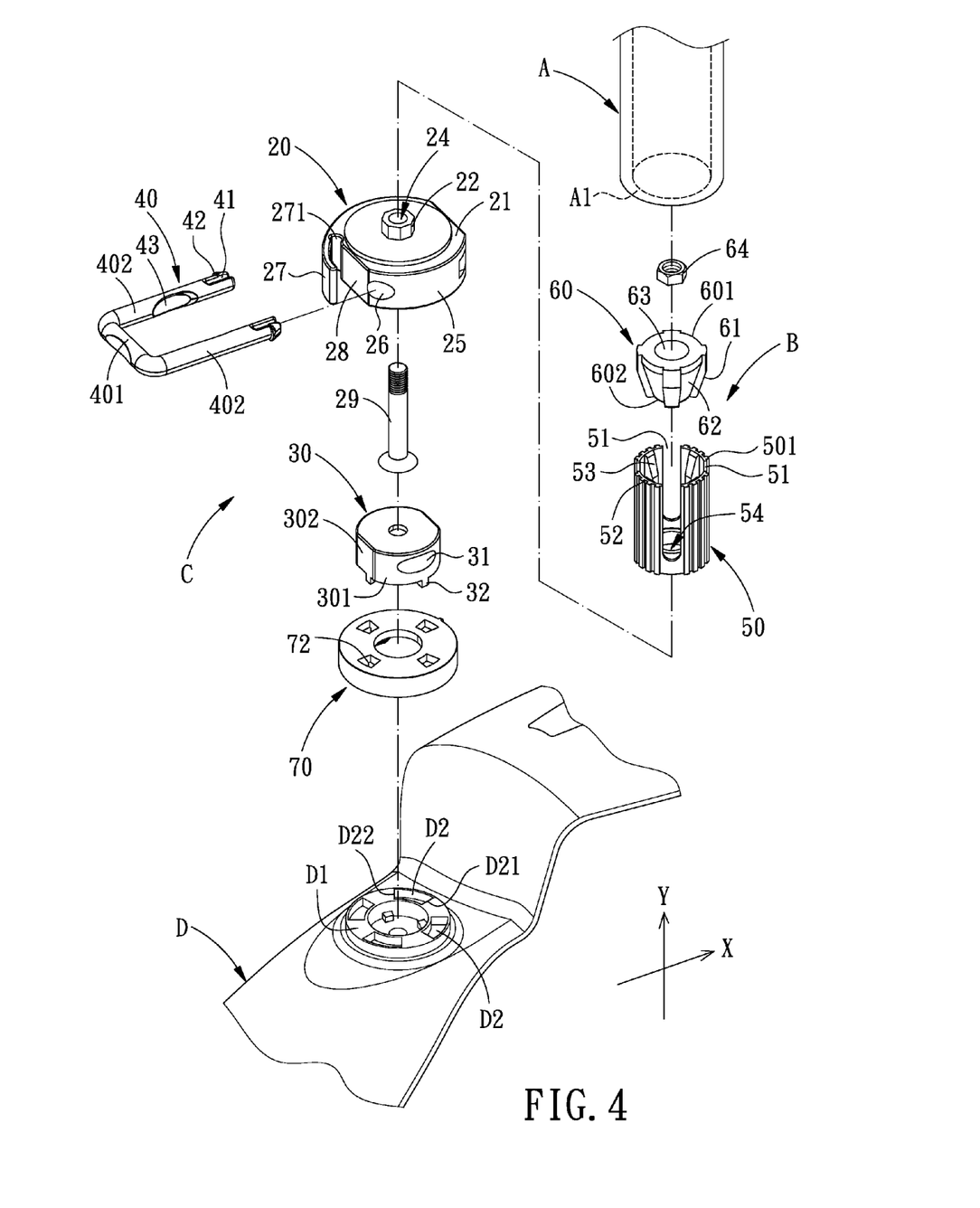
FIG. 4 is an exploded view of the quick-release fixing structure for a fender of a bicycle in accordance with the first embodiment of the present invention.

As shown in FIG. 4, in the center of the top surface 21 of the mounting member 20 is formed a polygonal protrusion 22, the mounting member 20 is further formed on its periphery with a flat surface 28 located corresponding to the elastic piece 27, and at the conjunction between the elastic piece 27 and the mounting member 20 is formed a deformable portion 271.

The engaging member 30 is formed around its periphery with two opposite arc-shaped surfaces 301 and two opposite positioning surfaces 302 and received in the receiving cavity 23 of the mounting member 20 in such a manner that the two arc-shaped surfaces 301 and the two positioning surfaces 302 of the engaging member 30 are aligned with the two arc-shaped surfaces 231 and the restricting surfaces 232 of the mounting member 20, respectively. Each of the arc-shaped surfaces 301 of the engaging member 30 is formed with an arc-shaped cutting groove 31 for mating with the arc-shaped cutting grooves 261 of the mounting member 20. In this embodiment, the restricting surfaces 232 and the positioning surfaces 302 are flat, so that the engaging member 30 can be engaged in the receiving cavity 23 of the mounting member 20, and the arc-shaped cutting groove 31 mates with the cutting groove 261 to form a complete hole.

The control member 40 is a U-shaped structure which is provided in the middle with a pressing section 401 and two engaging sections 402 at both ends of the pressing section 401. The engaging sections 402 of the control member 40 are inserted in the penetrating holes 26. Each of the engaging sections 402 is formed at an end thereof with a clamping slot 41 and a positioning protrusion 42 beside the clamping slot 41, so that when the clamping slots 41 are compressed, the engaging sections 402 can be inserted and fixed in the penetrating holes 26 by pressing the positioning protrusions 42 against the outer edge of the penetrating holes 26. An inner surface (facing the engaging member 30) of each of the engaging sections 402 is formed with an arc-shaped groove 43 which is shaped corresponding to the configuration of the arc-shaped surfaces 231 of the receiving cavity 23 of the mounting member 20, so that when the control member 40 is inserted in the penetrating holes 26, the arc-shaped groove 43 will mate with the cutting groove 261 of the mounting member 20.

Figure 5:
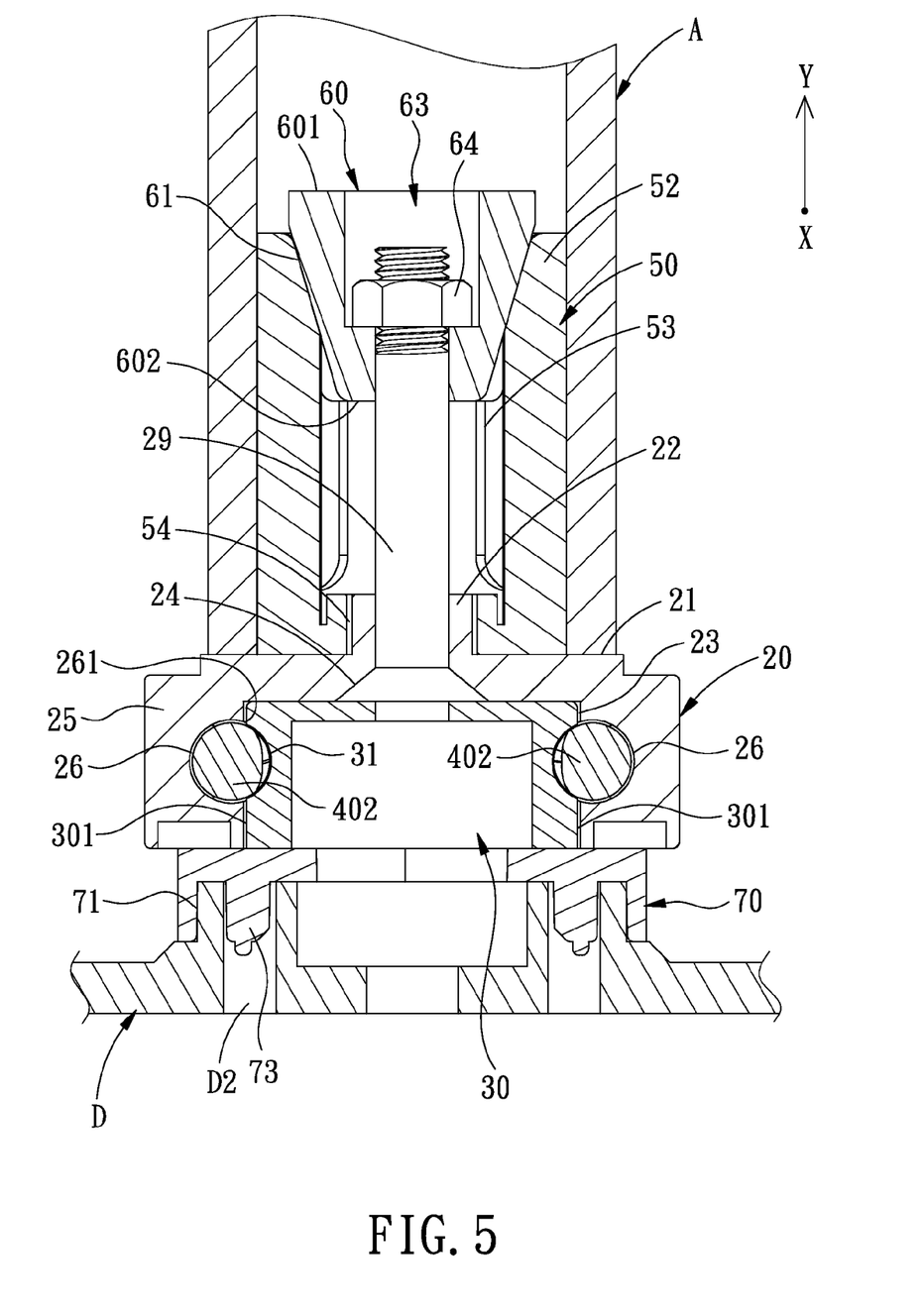
FIG. 5 is a cross sectional view of the quick-release fixing structure for a fender of a bicycle in accordance with the first embodiment of the present invention.
Figure 6:
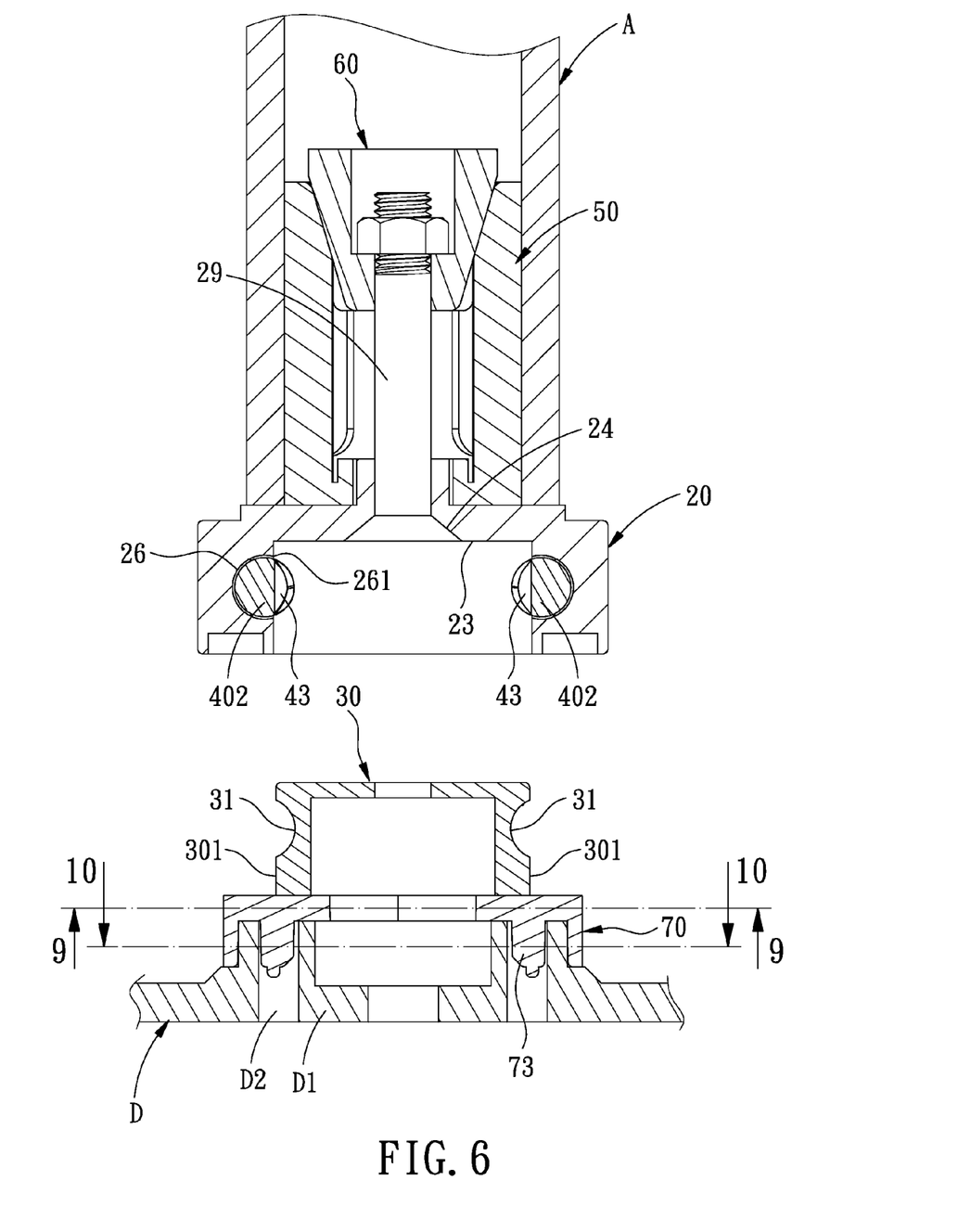
FIG. 6 is a cross sectional view of the present invention, showing that the mounting member is disengaged from the engaging member.

As shown in FIGS. 5 and 6, the elastic piece 27 of the mounting member 20 is pressed against the pressing section 401 of the control member 40 to make the arc-shaped grooves 43 of the control member 40 misaligned with the cutting grooves 261 of the mounting member 20, so that the engaging member 30 is engaged with the mounting member 20, or make the arc-shaped grooves 43 of the control member 40 aligned with the cutting grooves 261 of the mounting member 20, so that the engaging member 30 is disengaged from the mounting member 20.

Referring then to FIGS. 5-8B, pressing the pressing section 401 of the control member 40 can assemble the fender D to the mounting member 20 which is fixed to the front fork A or disassemble the fender D from the mounting member 20.

Figure 7A:
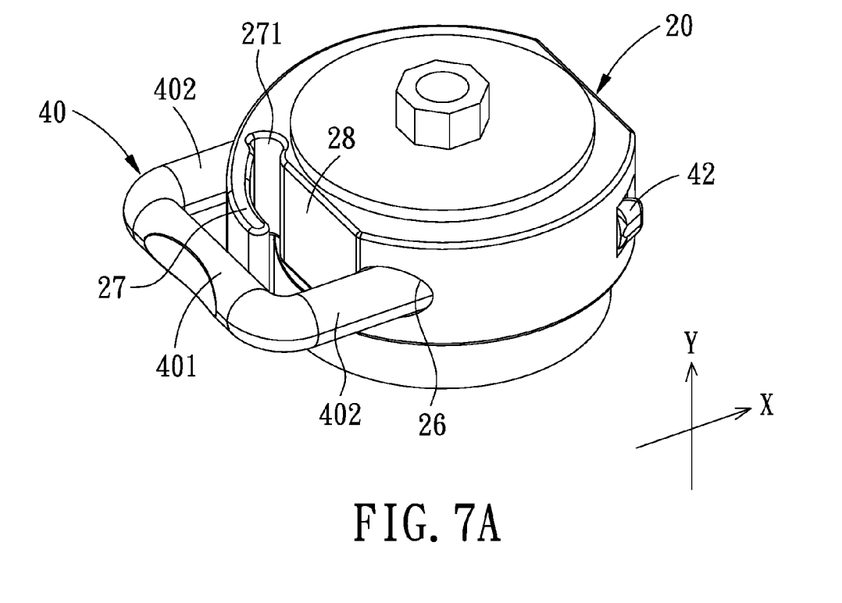
FIG. 7A is a perspective view of the present invention, showing that the mounting member is engaged with the engaging member.
Figure 7B:
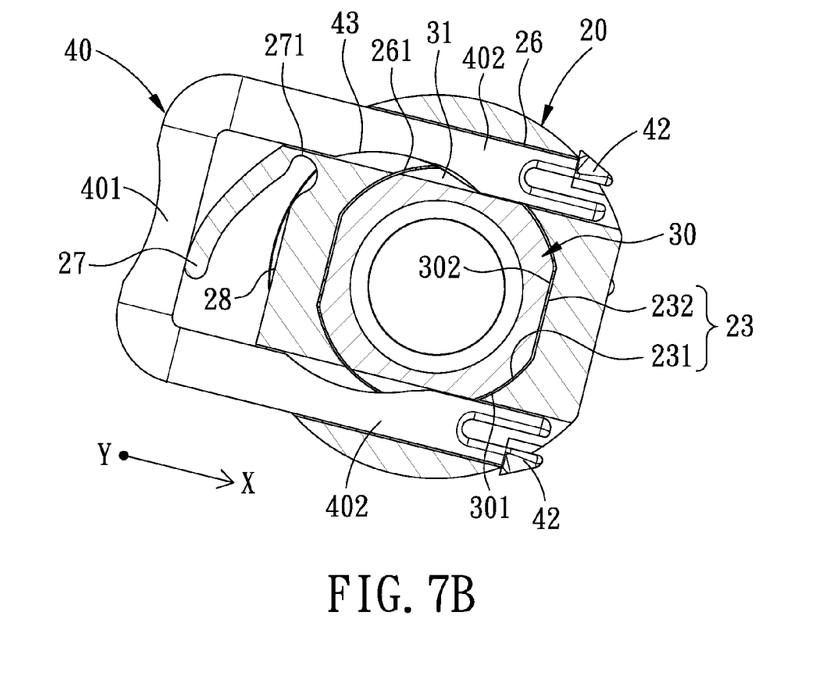
FIG. 7B is a cross sectional view of FIG. 7A.

When the control member 40 is not pressed, as shown in FIG. 7A, the elastic piece 27 of the mounting member 20 is elastically pressed against the pressing section 401 of the control member 40, and the positioning protrusions 42 of the control member 40 are positioned against the mounting member 20. As shown in FIGS. 5 and 7B, at this moment, the arc-shaped grooves 43 of the control member 40 are misaligned with the cutting grooves 261 of the mounting member 20, and the ends of the engaging sections 402 of the control member 40 are received in the arc-shaped cutting groove 31 of the engaging member 30, so as to prevent the engaging member 30 from disengaging from the mounting member 20 by moving in the longitudinal direction Y, so that the fender D which is provided with the engaging member 30 can be fixed to the front fork A equipped with the mounting member 20.

Figure 8A:
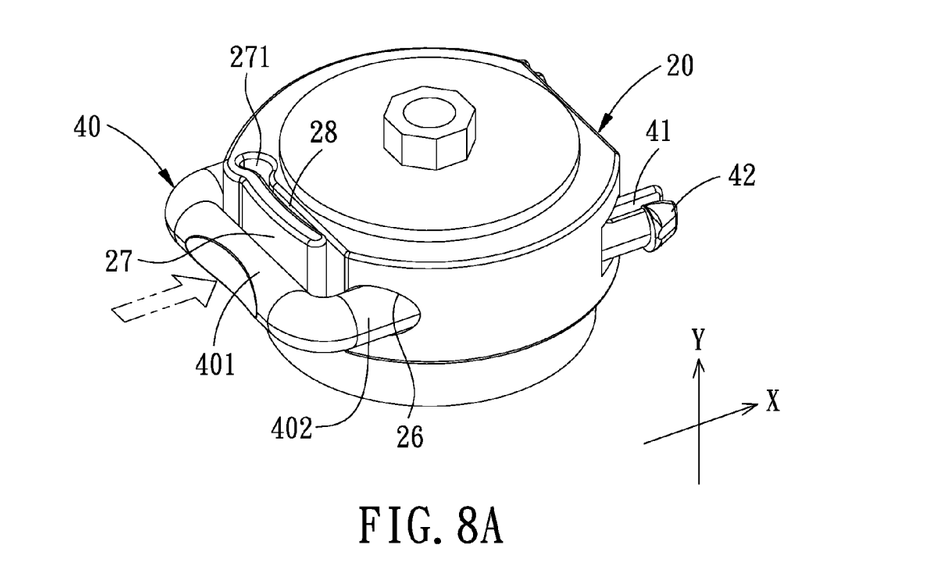
FIG. 8A is a perspective view of the present invention, showing that the mounting member is disengaged from the engaging member.
Figure 8B:
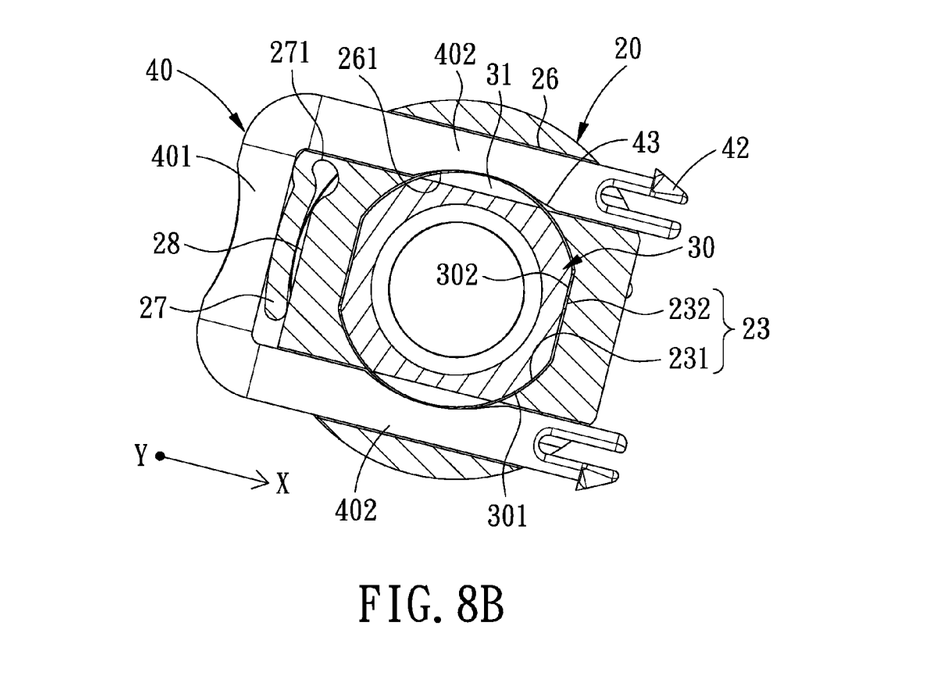
FIG. 8B is a cross sectional view of FIG. 8A.
Figure 9:
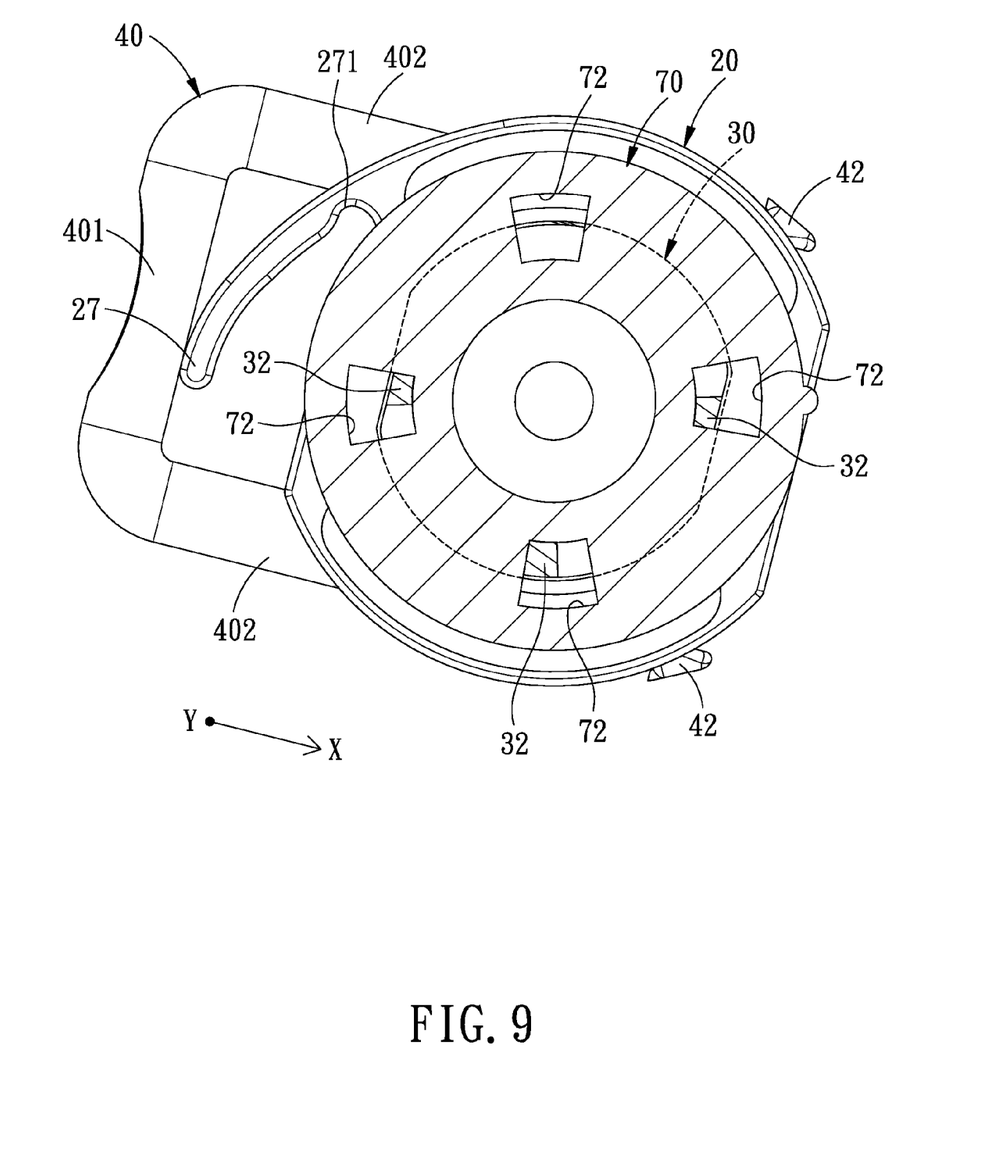
FIG. 9 is a cross sectional view taken along the line 9-9 of FIG. 6.
Figure 10:
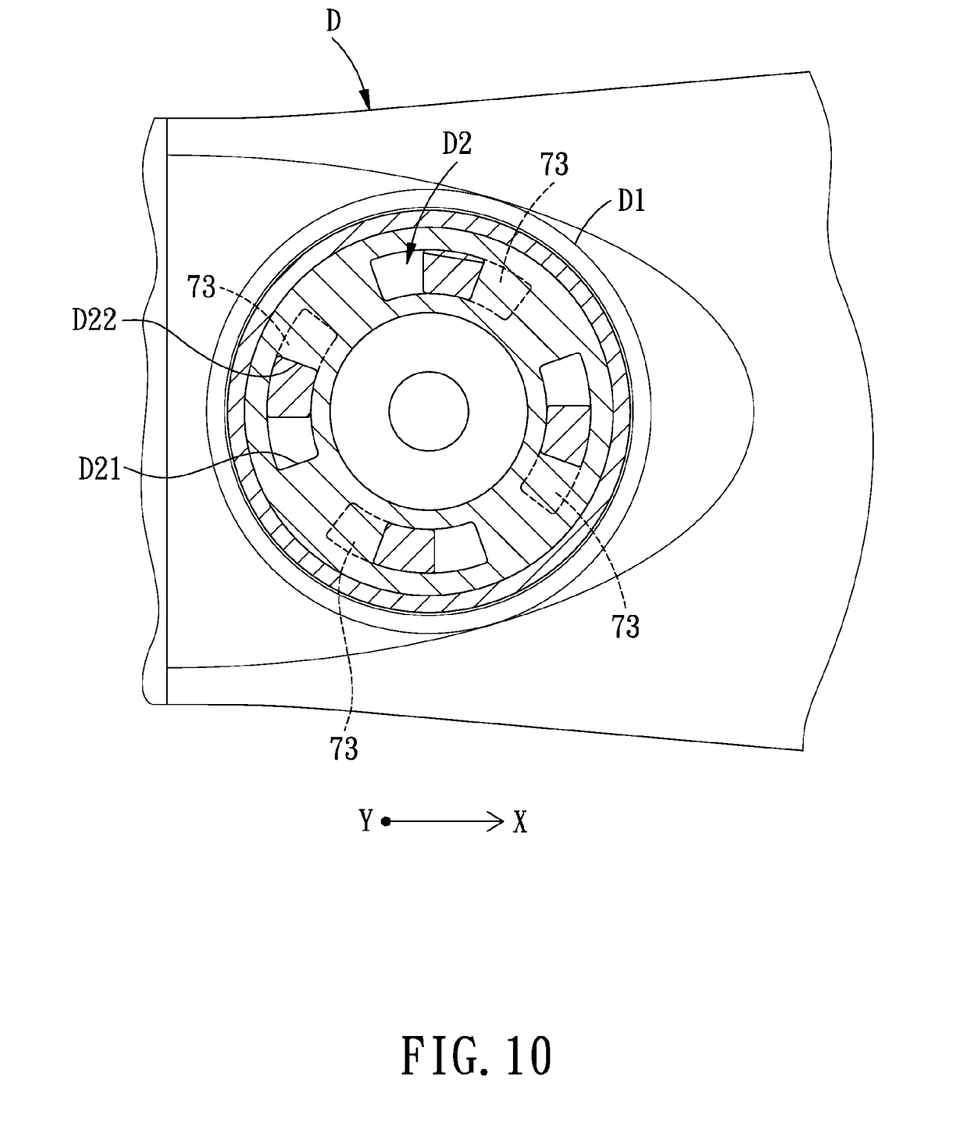
FIG. 10 is a cross sectional view taken along the line 10-10 of FIG. 6.

Referring to FIG. 8A, to remove the fender D, pressing the pressing section 401 of the control member 40 in the transverse direction X can make the elastic piece 27 deformed to push against the flat surface 28, as shown in FIGS. 6 and 8B, at this movement, the control member 40 is moved to make the arc-shaped grooves 43 of the control member 40 aligned with the cutting grooves 261 of the mounting member 20, so that the engaging member 30 can be disengaged from the mounting member 20, and consequently, the fender D can be removed from the front fork A. similarly, pressing the control member 40 again can make the arc-shaped grooves 43 of the control member 40 aligned with the cutting grooves 261 of the mounting member 20, so that the engaging member 30 can be pushed into the mounting member 20 by moving in the longitudinal direction Y, and when the control member 40 is not pressed, it will be pushed back to its original position by the elastic piece 27, so that the engaging member 30 is fixed in the mounting member 20.

Referring to FIGS. 4, 5, 9 and 10, the tightening device B comprises a clamping sleeve 50 and a tightening member 60.

The clamping sleeve 50 which extends in the longitudinal direction is mounted on the top surface 21 of the mounting member 20 and includes an open end 501 and a connecting end 502. The clamping sleeve 50 is formed with a plurality of longitudinal slots 51 extending from the open end 501, and a plurality of elastic pieces 52 arranged between the longitudinal slots 51. Each of the elastic pieces 52 is formed on its inner surface with a plurality of transverse ribs 53. At the connecting end 502 of the clamping sleeve 50 is formed a polygonal hole 54 for engaging with the polygonal protrusion 22 of the mounting member 20.

The tightening member 60 is inserted in the open end 501 of the clamping sleeve 50 and includes a big-diameter end 601, a small-diameter end 602 and a conical surface 61 between the big-diameter end 601 and the small-diameter end 602. The tightening member 60 is further provided with a locking hole 63 penetrating from the big-diameter end 601 to the small-diameter end 602. The tightening member 60 has its small-diameter end 602 inserted in the open end 501 of the clamping sleeve 50. The conical surface 61 is formed with a plurality of transverse grooves 62. The bolt 29 is inserted through the tapered hole 24 of the mounting member 20, the clamping sleeve 50, the locking hole 63 of the tightening member 60 and then screwed with a nut 64. The transverse ribs 53 of the clamping sleeve 50 are engaged with the transverse grooves 62 of the tightening member 60, and the elastic pieces 52 are pushed to press against the inner surface of the front fork A by the conical surface 61 of the tightening member 60.

Figure 11:
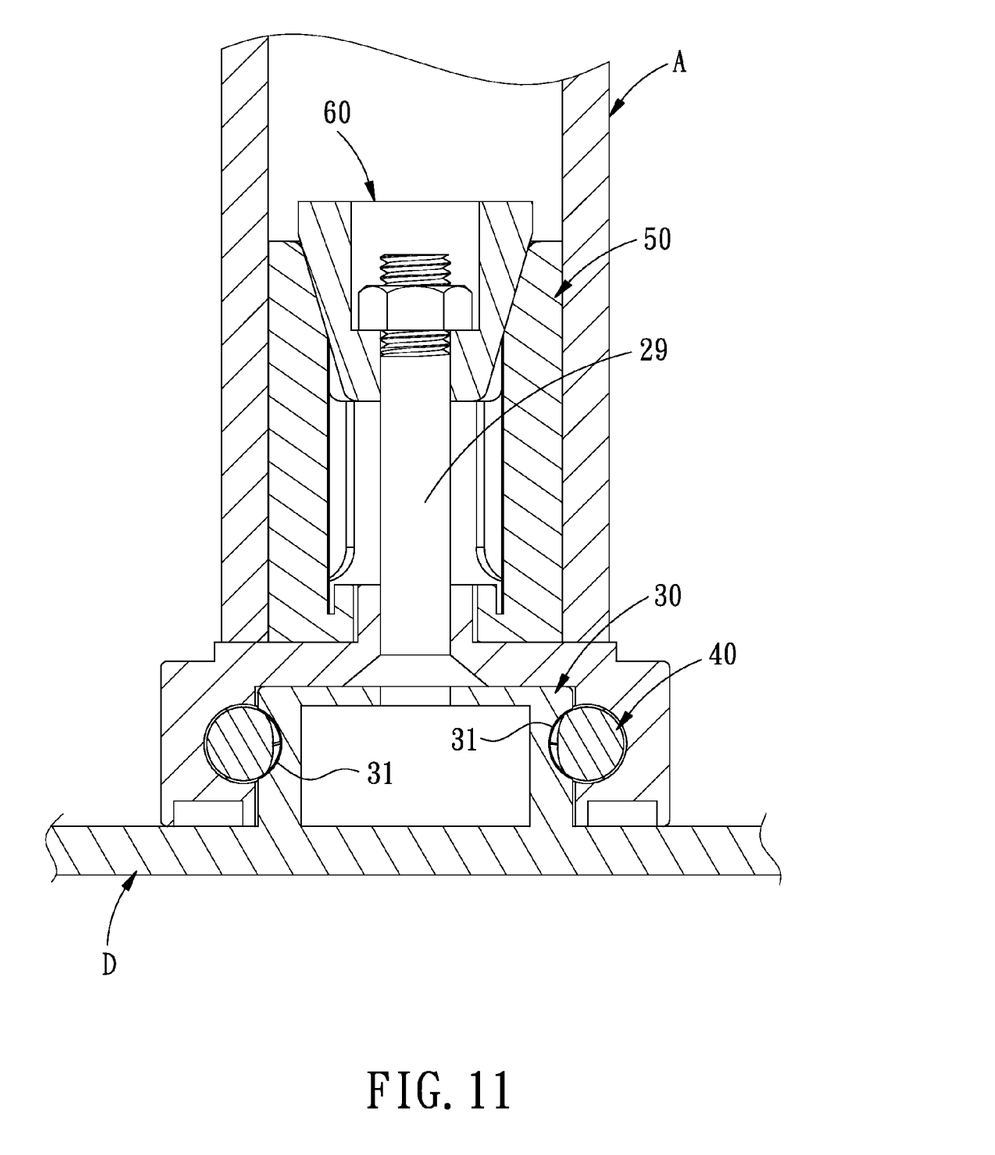
FIG. 11 is a cross sectional view of a quick-release fixing structure for a fender of a bicycle in accordance with a second embodiment of the present invention.

The engaging member 30 of the quick-release fixing structure C is fixed to the fender D by an engaging disc 70. The engaging member 30 is provided around its lower edge with a plurality of protrusions 32. The engaging disc 70 is formed at its bottom with an assembling space 71, and further formed in its top surface with a plurality of holes 72 in communication with the assembling space 71. The protrusions 32 of the engaging member 30 are engaged in the holes 72 of the engaging disc 70. In each of the holes 72 of the engaging disc 70 is formed an L-shaped engaging block 73. The fender D is same as the conventional structure and is provided on its surface with a circular connecting portion D1 which is formed with a plurality of arc-shaped cavities D2, and at both ends of each of the arc-shaped cavities D2 are formed with an inner wall D21 and an opening D22. The engaging blocks 73 of the engaging disc 70 are received in the arc-shaped cavities D2 and engaged in the openings D22 of the arc-shaped cavities D2. Furthermore, as shown in FIG. 11, the engaging member 30 can also been integral with the fender D and inserted directly in the mounting member 20.

In generally, the mounting member 20 with the penetrating holes 26 and the cutting grooves 261, the engaging member 30 with the arc-shaped cutting grooves 31, and the U-shaped control member 40 with the arc-shaped grooves 43 constitute the simply structured and easily operable quick-release fixing structure C which is capable of assembling the fender D onto the front fork A or disassembling it therefrom by a simple pressing operation. Besides, the engaging structures are all engaged in the transverse direction X, while the force for pushing the quick-release fixing structure C is applied in the longitudinal direction Y, which enables the quick-release fixing structure C to have a relatively strong structural strength, so as to prevent the quick-release fixing structure C from being damaged when it is pushed too hard.

While we have shown and described various embodiments in accordance with the present invention, it is clear to those skilled in the art that further embodiments may be made without departing from the scope of the present invention.

What is claimed is:

1. A quick-release fixing structure of a bicycle; comprising:
   a fender;
   a front fork;
   a mounting member having a top surface pressed against an abutting edge at an end of the front fork, in a bottom of the mounting member being formed a receiving cavity whose axial direction is defined as a longitudinal direction, and the mounting member being formed around its periphery with two penetrating holes which penetrate through the periphery of the mounting member to leave two cutting grooves on an inner surface of the receiving cavity, and the cutting grooves being in communication with the receiving cavity and the penetrating holes, an axial direction of the penetrating holes being defined as a transverse direction, an elastic piece extending from the mounting member, and a bolt which extends in the longitudinal direction being inserted through the receiving cavity and screwed with a tightening device, in a bottom of the receiving cavity being formed a tapered hole tapering toward the front fork, the mounting member being formed around its periphery with two opposite arc-shaped surfaces, the penetrating holes penetrating through the arc-shaped surfaces, the elastic piece extending from an end of one of the arc-shaped surfaces of the mounting member, and the bolt being inserted through the receiving cavity and screwed with the tightening device;
   an engaging member received in the receiving cavity of the mounting member and formed around its periphery with two arc-shaped cutting grooves for mating with the arc-shaped cutting grooves of the mounting member; and
   an U-shaped control member provided with a pressing section and two engaging sections at both ends of the pressing section, the engaging sections of the control member being inserted in the penetrating holes, each of the engaging sections being formed on an inner surface thereof facing the engaging member with an arc-shaped groove for mating with the cutting groove of the mounting member, the elastic piece of the mounting member being capable of pressing against the pressing section of the control member to make the arc-shaped grooves of the control member misaligned with the cutting grooves of the mounting member, so that the engaging member is engaged with the mounting member, or make the arc-shaped grooves of the control member aligned with the cutting grooves of the mounting member, so that the engaging member is disengaged from the mounting member, the pressing section being formed in the middle of the control member, each of the engaging sections being formed at an end thereof with a positioning protrusion, so that when the engaging sections are inserted in the penetrating holes, the positioning protrusions are pressed against an outer edge of the penetrating holes; and the fender being fixed to the end of the front fork, and the engaging member being disposed on the fender;

wherein the tightening device is fixed by pressing against an inner surface of the front fork and comprises a clamping sleeve and a tightening member:

the clamping sleeve which extends in the longitudinal direction is mounted on the top surface of the mounting member and includes an open end and a connecting end, the clamping sleeve is formed with a plurality of longitudinal slots extending from the open end, and a plurality of elastic pieces arranged between the longitudinal slots;

the tightening member is inserted in the open end of the clamping sleeve and includes a big-diameter end, a small-diameter end and a conical surface between the big-diameter end and the small-diameter end, the tightening member is further provided with a locking hole penetrating from the big-diameter end to the small-diameter end, the tightening member has its small-diameter end inserted in the open end of the clamping sleeve, the bolt is inserted through the tapered hole of the mounting member, the clamping sleeve, the locking hole of the tightening member and then screwed with a nut, and the elastic pieces are pushed to press against the inner surface of the front fork by the conical surface of the tightening member.

2. The quick-release fixing structure of a bicycle as claimed in claim 1, wherein each of the elastic pieces is formed on its inner surface with a plurality of transverse ribs for engaging with a plurality of transverse grooves formed in the tightening member.

3. The quick-release fixing structure of a bicycle as claimed in claim 1, wherein a polygonal protrusion is formed in a center of the top surface of the mounting member, and at the connecting end of the clamping sleeve is formed a polygonal hole for engaging with the polygonal protrusion of the mounting member.

4. The quick-release fixing structure of a bicycle as claimed in claim 1, wherein each of the engaging sections is formed at an end thereof with a clamping slot.

5. The quick-release fixing structure of a bicycle as claimed in claim 1, wherein the fender is provided with a circular connecting portion, the engaging member is fixed to the fender by an engaging disc, the engaging member is provided around its lower edge with a plurality of protrusions, the engaging disc is formed at its bottom with an assembling space, and further formed in its top surface with a plurality of holes in communication with the assembling space, the protrusions of the engaging member are engaged in the holes of the engaging disc.

6. The quick-release fixing structure of a bicycle as claimed in claim 5, wherein each of the holes of the engaging disc is formed an L-shaped engaging block, the connecting portion is formed with a plurality of arc-shaped cavities, and at both ends of each of the arc-shaped cavities are formed with an inner wall and an opening, the engaging blocks of the engaging disc are received in the arc-shaped cavities and engaged in the openings of the arc-shaped cavities.

7. The quick-release fixing structure of a bicycle as claimed in claim 1, wherein the mounting member is further formed on its periphery with a flat surface located corresponding to the elastic piece, and at a conjunction between the elastic piece and the mounting member is formed a deformable portion, the elastic piece is pressed against the flat surface.

8. The quick-release fixing structure of a bicycle as claimed in claim 1, wherein the receiving cavity is formed around its inner surface with two opposite arc-shaped surfaces and two opposite restricting surfaces, the engaging member is formed around its periphery with two opposite arc-shaped surfaces and two opposite positioning surfaces and received in the receiving cavity of the mounting member in such a manner that the two arc-shaped surfaces and the two positioning surfaces of the engaging member are aligned with the two arc-shaped surfaces and the restricting surfaces of the mounting member, respectively.

* * * * *